(12) United States Patent
Tan et al.

(10) Patent No.: US 6,725,337 B1
(45) Date of Patent: Apr. 20, 2004

(54) METHOD AND SYSTEM FOR SPECULATIVELY INVALIDATING LINES IN A CACHE

(75) Inventors: Teik-Chung Tan, Austin, TX (US); Benjamin T. Sander, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 124 days.

(21) Appl. No.: 09/859,290

(22) Filed: May 16, 2001

(51) Int. Cl.⁷ .............................................. G06F 12/00
(52) U.S. Cl. ...................... 711/133; 711/144
(58) Field of Search ................. 711/133, 135, 711/118, 119, 122, 144, 141; 712/1

(56) References Cited

U.S. PATENT DOCUMENTS

| | | |
|---|---|---|
| 5,717,895 A | 2/1998 | Leedom et al. |
| 5,835,950 A * | 11/1998 | Cho et al. .................... 711/144 |
| 5,924,118 A | 7/1999 | Arimilli et al. ............. 711/130 |
| 5,946,705 A * | 8/1999 | Cumming et al. .......... 711/108 |
| 5,987,585 A * | 11/1999 | Motoyama et al. ............. 712/1 |
| 6,119,205 A | 9/2000 | Wicki et al. ................ 711/143 |
| 6,175,906 B1 | 1/2001 | Christie ..................... 711/207 |

FOREIGN PATENT DOCUMENTS

EP 0833248 4/1998

OTHER PUBLICATIONS

Koppelman, "Speculative Multiprocessor Cache line Actions Using Instruction History" in Proceedings of the 10$^{th}$ Internation Conference on Parallel and Distributed Computing Systems, Oct., 1997; all pages.*

Lebeck, Dynamic Self–Invalidation: Reducing Coherence Overhead in Shared–Memory Multiprocessors in Proceedings of the 22$^{nd}$ Annual International Symposium on Computer Architecture, 1995; all pages.*

* cited by examiner

*Primary Examiner*—Kimberly McLean-Mayo
(74) *Attorney, Agent, or Firm*—Meyertons, Hood, Kivlin, Kowert, & Goetzel, P.C.; B. Noël Kivlin (57) ABSTRACT

A cache controller configured to speculatively invalidate a cache line may respond to an invalidating request or instruction immediately instead of waiting for error checking to complete. In case the error checking determines that the invalidation is erroneous and thus should not be performed, the cache controller protects the speculatively invalidated cache line from modification until error checking is complete. This way, if the invalidation is later found to be erroneous, the speculative invalidation can be reversed. If error checking completes without detecting any errors, the speculative invalidation becomes non-speculative.

44 Claims, 7 Drawing Sheets

METHOD AND SYSTEM FOR SPECULATIVELY INVALIDATING LINES IN A CACHE

BACKGROUND OF THE INVENTION

1. Field of the Invention

This invention relates to caches and, more particularly, to invalidating lines in a ache.

2. Description of the Related Art

Since main system memory is typically designed for density rather than speed, microprocessor designers have added caches to their designs to reduce the microprocessor's need to directly access main memory. A cache is a small memory that is more quickly accessible than the main memory. Computer systems may have a number of different levels of caches. For example, a computer system may have a "level one" (L1) cache and a "level two" (L2) cache. These caches are typically integrated with the microprocessor. Caches are typically constructed of fast memory cells such as static random access memories (SRAMs) which have faster access times than the memories used for the main system memory (typically dynamic random access memories (DRAMs) or synchronous dynamic random access memories (SDRAMs)). The faster SRAMs are not typically used for main system memory because of their low density and high cost.

Many other types of caching are also possible. For example, the main system memory may act as a cache for the system's slower direct access storage devices (e.g., hard disk drives). Other devices, such as hard drives, may also include internal caches to improve their performance.

When a microprocessor needs data from memory, it typically first checks its L1 cache to see if the required data has been cached. If not, the L2 cache is checked. At the same time, the data may be requested from memory, in case there is a miss in the L2 cache. If the L2 cache is storing the data, it provides the data to the microprocessor (typically at much higher rate and lower latency than the main system memory is capable of), and if the data was requested from memory, that request may be cancelled. If the data is not cached in the L1 or L2 caches (referred to as a "cache miss"), the data is read from main system memory or some type of mass storage device (e.g., a hard disk drive). Relative to accessing the data from the L1 cache, accesses to memory take many more clock cycles. Similarly, if the data is not in the main system memory, accessing the data from a mass storage device takes even more cycles.

Caches typically operate on the principal of locality of reference, which states that the data most recently used (and the data in that locality) is mote likely to be accessed than the rest of the data. This principle holds because computer software typically has loops and branches that cause previously executed code to be re-executed. By storing recently accessed instructions and data in a cache, system performance may be increased because the microprocessor need not wait for the instructions and data to be read from main memory.

Microprocessor and computer system architects have taken the locality of reference principle one step further by using techniques such as branch prediction to proactively store instructions and data in the cache before they are actually needed by the microprocessor. In addition, when an instruction or byte of data is read from memory, additional bytes following the instruction or data are read and cached. Once again, the principal of locality of reference dictates that these instruction and data bytes are more likely to be needed by the processor than the other data or instructions at large.

There are several different ways to map the system memory into the cache. One common approach utilizes an n-Way set-associative cache, in which the cache is segmented into sets. Each set contains n cache lines. A cache line is a sequential group of bytes (e.g., 32 or 64). For efficiency purposes, cache memory transactions are typically in cache lines rather than in single bytes. Cacheable locations in main memory may each be assigned to one of the sets of cache lines. As a result, each location may be cached in any one of the n locations within its assigned set. One special case of the n-Way set-associative cache is the direct-mapped cache. In a direct-mapped cache, n=1, and thus each memory location maps to only one location in the cache. Another special case of the n-Way set-associative cache is the fully associative cache. In this case, n=m, where m is the number of lines in the cache (and thus there is only one "set"). In this case, each memory location may map to any of the cache locations.

Two basic performance criteria for caches are hit ratio (i.e., the ratio of the memory accesses that are found in the cache to the total number of memory accesses) and search speed (i.e., how quickly a hit or miss determination can be made). In a direct-mapped cache, search speed is optimized at the cost of hit ratio. This is because it is relatively easy to determine hits/misses (since a memory location only maps to one cache line, only that line needs to be checked) but more difficult to have a high hit ratio since multiple memory locations map to a single cache line. Conversely, fully-associative caches optimize hit ratios while sacrificing search speed. Allowing all memory locations to map to any cache line improves the probability that there will be a hit but greatly increases the complexity of searches since all cache lines must be searched for each memory location. Set-associative caches attempt to compromise between the two by offering more associativity (and thus higher hit ratios) than direct-mapped caches while also offering faster search speeds than fully-associative caches.

Since cache size is limited by a number of factors (including die size, power consumption, and cost), care must be taken when loading information into the cache. Once particular area of concern for the designer arises when deciding a policy for overwriting or invalidating existing instructions and data in a cache to make room for new instructions and data. Thus, in set-associative caches where n >1 (and thus there are choices as to which line to cache a particular memory location), there needs to be some way to choose which of the possible cache lines to fill with new data. A common solution is to track the relative order of access to each cached memory location and then replace the least recently used instructions or data with new instructions or data. This solution is based on the principle that recently accessed cache lines are more likely to be accessed again. Other solutions include random replacement and first-in first-out techniques.

On average, least-recently used (LRU) cache replacement algorithms provide better performance than other algorithms. However, in order to determine the least recently used (LRU) cache line in an n-way set associative cache, conventional approaches require a significant amount of complex hardware, including counters and n-way multiplexers, to implement the LRU algorithm. Additionally, status bits for each cache entry track the usage of each entry. When a new entry is made in the set, the status bits are scanned to determine which of the cache lines is the least recently used or invalid. The least recently used or invalid line is then evicted to make room for the new entry. Drawbacks of a conventional LRU replacement algorithm include the amount of hardware and number of status bits time required to implement the algorithm as well as the time and hardware required to scan for invalid entries in the set.

In general, it is desirable to improve the performance of cache subsystems. For example, as processor speeds improve, it is desirable to provide cache subsystems that are capable of more quickly supplying more data.

SUMMARY

In may often be useful to invalidate a line in a cache. However, a cache line invalidation may depend on many underlying factors. In many circumstances, error checking is performed to determine whether these underlying factors were correct. If these factors are not correct, the invalidation is erroneous and should not be performed. Since error checking may take a significant amount of time to complete, a determination as to whether an invalidation is erroneous or not may not be available when the invalidating request is actually accepted by a cache controller. As a result, invalidation requests may require a cache controller to spend time waiting for error checking to resolve, preventing the cache controller from moving on to other pending tasks. At the same time, it may be rare for a cache line invalidation to be erroneous, and thus the time the cache controller spends waiting for error checking to complete is often wasted.

If a cache controller is configured to speculatively invalidate a cache line, the cache controller may be able to respond to an invalidating request immediately instead of waiting for error checking to complete. In order to handle the rare situation where the invalidation is erroneous and thus should not be performed, the cache controller may also protect the speculatively invalidated cache line from modification until error checking is complete. This way, if the invalidation is later found to be erroneous, the speculative invalidation can be reversed.

Accordingly, various embodiments of methods and systems for speculatively invalidating a line in a cache are disclosed. In one embodiment, a computer system includes a processor, a system memory, a cache controller, a cache, and an error detection unit. The cache is coupled to the processor and includes a plurality of cache line storage locations. The cache controller is coupled to receive a first request that invalidates a first cache line. In response to receiving the first request, the cache controller is configured to speculatively invalidate the first cache line. In order to preserve the first cache line in case the speculative invalidation later needs to be reversed, the cache controller is further configured to prevent modification of the first cache line storage location until the invalidation of the first cache line becomes non-speculative. The error detection unit is configured to perform at least one check corresponding to the first request. For example, the error detection unit may be the cache controller itself, and the checking may involve checking to make sure that an operation that led to the speculative invalidation (e.g., a hit in an exclusive cache in response to a fill request from a higher-level cache) was proper given the state of the first cache line. If the error detection unit performs the check and does not detect any errors, the invalidation of the first cache line becomes non-speculative.

In one embodiment, the cache controller may be configured to speculatively invalidate the first cache line by toggling a validity bit associated with the first cache line. Accordingly, reversing the speculative invalidation may involve re-toggling the validity bit to show that the first cache line is again valid. Also, in some embodiments, the cache controller may be configured to not accept requests that depend on a state of or data in the first cache line until the invalidation of the first cache line becomes non-speculative. This way, these requests may be delayed until the speculative invalidation either becomes non-speculative or is reversed. Generally, until the invalidation of the first cache line becomes non-speculative, the cache controller may be configured to not accept additional requests based on the type of request and whether the request depends on or modifies the speculatively invalidated first cache line. For example, the cache controller may be configured to not accept the additional requests that are: fill requests from a higher-level cache that hit the first cache line, probe or state-change requests for the first cache line, or copy backs from the higher-level cache that select the first cache line for replacement. The cache controller may be configured to not accept additional requests that match part of the tag of the first cache line.

In some embodiments, as part of the speculative invalidation, the cache controller may be configured to save the pre-speculative invalidation replacement state (e.g., the state used to select a line for replacement) associated with the first cache line and to update the post-speculative invalidation replacement state of the first cache line as if the first cache line had been invalidated. If the speculative invalidation is later determined to be erroneous, the cache controller may restore the saved pre-speculative invalidation replacement state when reversing the speculative invalidation.

In another embodiment, a method of speculatively invalidating a line in a cache is disclosed. The method includes accepting a request that results in the line in the cache being invalidated, initiating checks that determine whether the invalidation is erroneous, and speculatively invalidating the line. Speculatively invalidating the line involves indicating that the line is invalid and protecting the line from subsequent modification until the checks have completed. If one of the checks determines that the invalidation is erroneous, the method also includes reversing the speculative invalidation by indicating that the line is valid again.

In another embodiment, a method of speculatively invalidating a first cache line in an exclusive cache is disclosed. The method may include accepting a fill request from a higher-level cache, determining whether the fill request hits in the exclusive cache, initiating checks that determine whether the fill request initiated erroneously, and, if the fill request hits in the exclusive cache, providing the first cache line from the exclusive cache to the higher-level cache. If the checks have not yet completed when the first cache line is provided to the higher-level cache, the first cache line may be speculatively invalidated. Speculatively invalidating may include indicating that the first cache line is invalid and protecting the first cache line from subsequent modification until the checks complete.

In yet another embodiment, a cache subsystem is disclosed. The cache subsystem includes a cache and a cache controller. The cache controller is configured to speculatively invalidate a first cache line. If the speculative invalidation is detected to be erroneous, the cache controller may be configured to reverse the speculative invalidation. The cache subsystem may also include a speculative invalidation controller configured to protect the first cache line from modification until the invalidation becomes non-speculative. Detecting whether the speculative invalidation is erroneous may take a certain number of cycles, and thus the speculative invalidation may not become non-speculative until after that certain number of cycles.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Cache Subsystems

Computer systems (such as those illustrated in FIGS. 6 and 7 below) typically employ cache subsystems. Typically, these cache subsystems include an L1 cache integrated with a processor and a non-integrated L2 cache. However, as advances in process technology enable higher integration in semiconductor devices, microprocessor designers are now able to include second-level (L2) caches on-chip as a way to further improve performance. By integrating the L2 cache, transfer latency and transfer bandwidth between the L1 and L2 caches may be improved since communication will no longer need to take place through pins.

Traditional approaches have designed the primary (L1) cache with the goal of making the L1 cache as large as possible without incurring additional access latency. This large L1 cache has traditionally been complimented with a similarly large L2 cache, normally as large or larger than the L1 cache, that has a latency that is normally greater than that of the L1 cache but less than that of system memory.

Figure 1A:
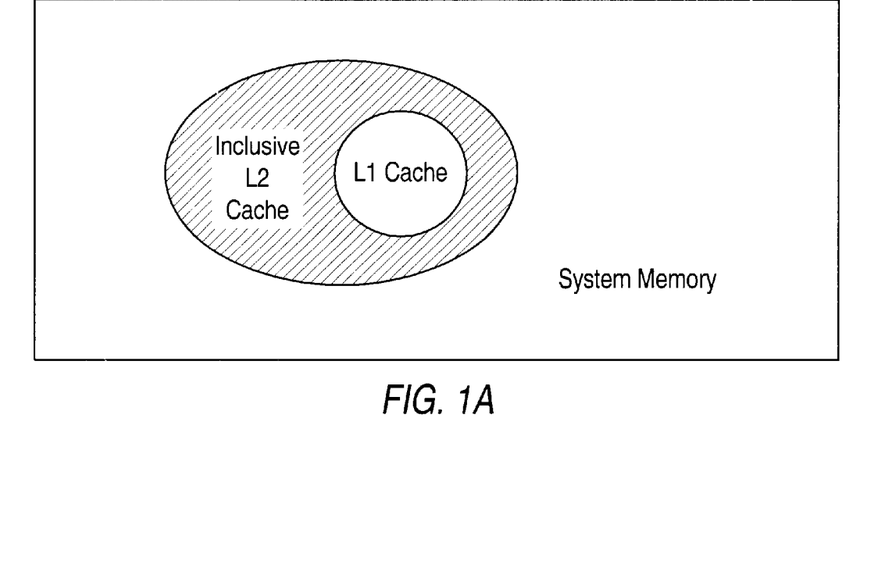
FIG. 1A presents a Venn diagram showing the relationship between inclusive caches in one embodiment.
Figure 1B:
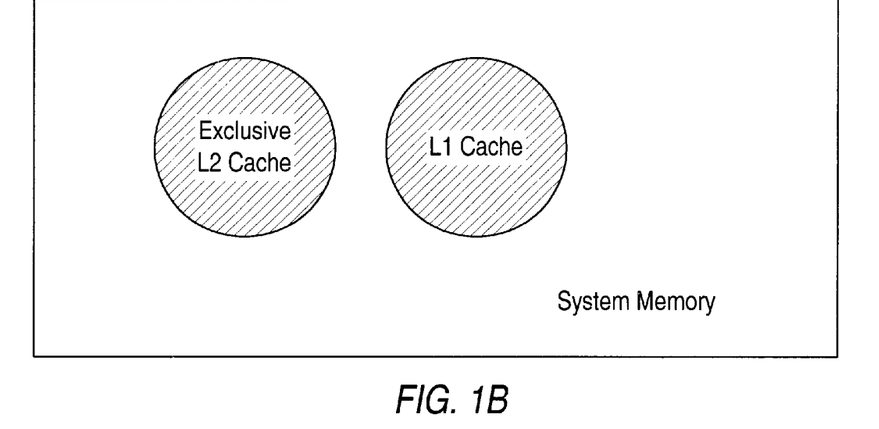
FIG. 1B presents a Venn diagram showing the relationship between exclusive caches in one embodiment.

An L2 cache may be designed to be inclusive, exclusive, or neither. In an ideal inclusive L2 cache, every line that is in the L1 cache is also in the L2 cache, as represented by the Venn diagram in FIG. 1A. In contrast, in an ideal exclusive L2 cache, lines that are in the L1 cache are not in the L2 cache, as shown in the Venn diagram of FIG. 1B. Note that in some embodiments, both the inclusive and the exclusive L2 caches may be inclusive with respect to system memory (as shown in FIGS. 1A and 1B), and thus an "exclusive" L2 cache may only be exclusive with respect to an L1 cache. In a cache system that is neither inclusive nor exclusive, the lines that are stored in the L2 cache do not depend on which lines are stored in the L1 cache, and thus there are no guarantees as to whether a line in the L1 cache will be present or not in the L2 cache.

With each of these principles, there are both advantages and disadvantages. Typically, most L2 caches have been inclusive. In an inclusive cache, the number of L1 to L2 data transfers may be reduced. This reduction in the number of transfers occurs because a non-modified L1 victim does not need to be copied back to the L2 cache. A victim is a data block that is written back to main memory before it is reused. For example, if a fill in the L1 cache requires that an existing line be replaced, the existing line, or victim, is ejected from the L1 cache to make room for the incoming line. In an inclusive cache, a copy of an L1 victim is already present in the L2 cache. Therefore, if the L1 victim has not been modified while in the L1 cache, there is no need to copy that line to the L2 cache since an identical line already exists. For off-chip L2 caches, inclusivity may also be very important because it eliminates the need to perform an external L2 tag lookup during a L1 to L2 copy back because a line in the L1 cache is guaranteed to be in the L2 cache. Additionally, the L2 cache may be a snoop filter for the L1 cache (e.g., when an in-line L2 configuration is used).

One major drawback of an inclusive cache is that it offers reduced effective cache size. Since every line in the L1 is also in the L2, the effective cache size of the L1 and L2 caches together is only the size of the L2 cache, as shown in FIG. 1A. This is one reason why L2 caches are typically larger than L1 caches. Another drawback is the more complicated controller design required for the cache controllers because of the need to maintain inclusivity. For example, when a potential L2 victim is selected, the inclusive cache controller must back-probe the L1 cache to make sure that the L2 victim does not currently reside in the L1 cache. If a potential L2 victim does reside in the L1 cache, another victim may need to be selected to maintain inclusivity. Alternately, in some embodiments, if the potential L2 victim also resides in the L1 cache, inclusivity may be maintained by invalidating the corresponding line in the L1 cache (as opposed to selecting another L2 victim).

Since caches are typically low-density, high cost memories, integrating L2 caches has historically been a disfavored design choice from both a cost and an on-chip real estate standpoint, especially since L2 caches have typically been inclusive and thus larger than L1 caches.

In contrast to inclusive caches, exclusive caches may offer larger effective cache sizes equal to the combined size of the L1 and L2 caches, as shown in FIG. 1B. This larger effective cache size may result in better hit ratios. Additionally, since there is no need to back-probe the L1 cache when evicting L2 victims, the complexity of the L2 controller may be reduced.

When using an exclusive cache, the number of transfers between the L1 and the L2 cache may increase. For example, the number of L1 to L2 data transfers may increase because L1 victims, regardless of whether they have been modified or not, may be copied to the L2 cache in accordance with the locality of reference principal. Storing L1 victims in the L2 cache may satisfy the locality of reference principal since an L1 victim has probably been used more recently than any of the other lines in the L2 cache. In some instances, the increased L1 to L2 traffic may make an inclusive cache more desirable, depending on the communication link between the L1 and L2 caches.

Exclusive caches may also be useful in other caching applications. For example, it may be useful to design a multi-level cache subsystem for use with a graphics system or hard disk drive. In these embodiments, it may be desirable to use an exclusive cache to increase the effective size of the cache subsystem without requiring as much additional cache memory as would be required for a inclusive cache. In some embodiments, the exclusive cache may be a practical design choice even if it is not integrated on the same substrate as a higher-level cache.

Figure 2:
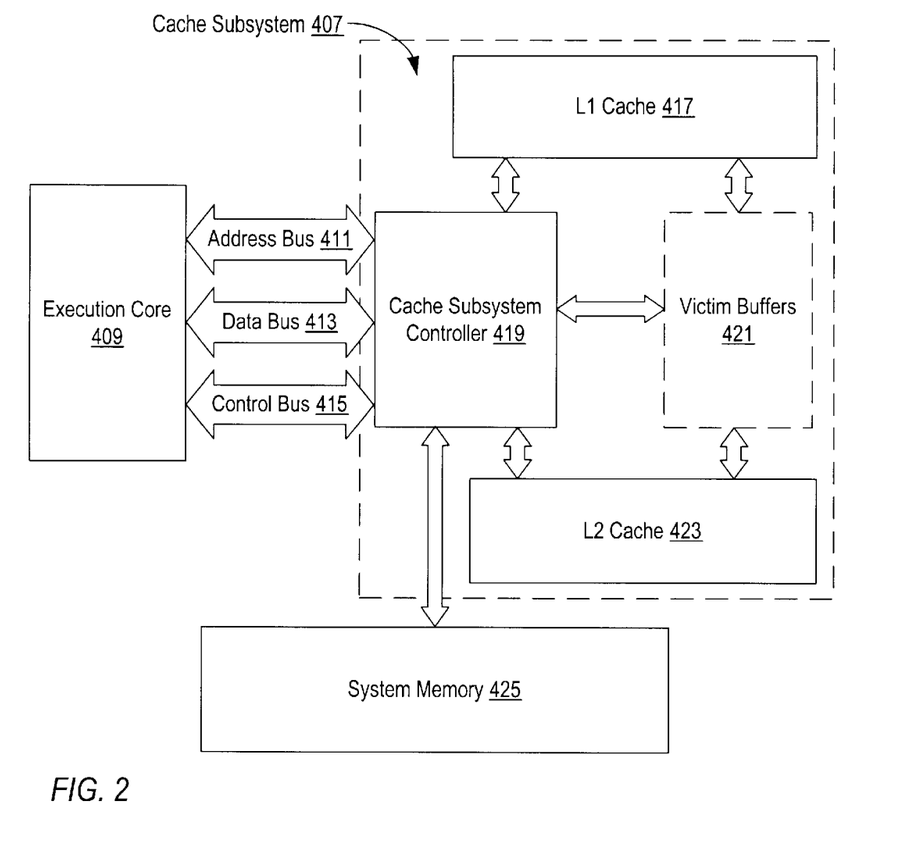
FIG. 2 is a block diagram of one embodiment of a cache subsystem.

FIG. 2 shows one embodiment of a cache subsystem 407 that is configured to store data and/or instruction lines from a system memory 425 for use by an execution core 409. The execution core 409 requests data by presenting an address on address bus 411 to the cache subsystem controller 419. The address may be a virtual address. While the same cache subsystem controller 419 controls both the L1 and the L2 caches in this example, separate L1 and L2 controllers may be used in other embodiments. The L2 cache 423 may be exclusive, inclusive, or neither exclusive nor inclusive.

In response to receiving an address from the execution core 409, the cache subsystem controller 419 may present the address to the L1 cache 417. In some embodiments, the L1 cache 417 may be linearly or virtually addressed, so if the address received from the execution core 409 is a virtual address, there may not be any need to translate the address before presenting it to the L1 cache 417. In contrast, the L2 cache 423 may be physically addressed in some embodiments, so virtual addresses may have to be translated before presentation to the L2 cache 423 when there is a miss in the L1 cache 417. In other embodiments, both caches may be addressed in the same way (e.g., virtually or physically).

When a L1 fill request misses in the L2 cache 423, the line may be requested from system memory 425 and brought into the L1 cache 417 (e.g., if the L2 cache 423 is exclusive) or into the L2 and L1 caches (e.g., if the L2 cache 423 is inclusive). In order to fill the requested line in the L1 cache 417, an L1 victim may be created and copied back into the L2 cache 423 (regardless of whether the L1 victim is clean or modified if the L2 cache 423 is exclusive, or if the L1 victim is modified if the L2 cache 423 is inclusive). If the L2 cache 423 is exclusive, this copy back may require an L2 line to be evicted, so an L2 victim may be created and, if the victim is modified, written back to memory 425. In an embodiment where the L2 cache 423 is exclusive, both the L1 and L2 caches may share one or more victim buffers 421 that buffer victim lines as they are copied back to the exclusive L2 cache 423 (if they are L1 victims) or to system memory 425 (if they are modified L2 victims).

When an L1 fill request hits in an L2 cache 423, the line may be copied into the L1 cache 417. If the L1 request hits in an L2 exclusive cache 423, it may be preferable to invalidate the hit line (as opposed to leaving it valid) for several reasons associated with maintaining exclusivity. For example, if the line is invalidated, then there is only one copy of the line in the cache subsystem 407. This may greatly simplify the control logic for the cache subsystem 407 because it does not have to track which copy of that line is more up to date at any given time. Additionally, invalidating the line frees up a location in the L2 cache 423, allowing the greater effective cache size offered by an exclusive cache system to be realized. However, before a line is invalidated, several checks may be performed to determine whether the operation (e.g., a miss in an L1 cache that generates a fill request to the L2 cache) that led to the invalidation was performed erroneously. If the checks reveal an error, that operation may be cancelled and/or retried at a later time. Thus, the invalidation should only occur if these checks indicate that the conditions causing the invalidation are not erroneous.

There are also many situations where lines may be invalidated in an inclusive cache or in a cache that is neither exclusive nor inclusive. As with the exclusive cache invalidations, these checks may ultimately depend on various checks that determine whether the invalidating instruction was erroneous. For example, when instructions are executing out-of-order, an instruction may be fetched as the result of a branch prediction. If this branch prediction turns out to be incorrect, execution of the fetched instruction may need to be cancelled and/or the effects of the fetched instruction's execution may need to be reversed. Alternately, an instruction executing out-of-order in a non-privileged mode may be a privileged instruction. If one of these instructions is an instruction that invalidates a cache line or block without actually flushing the line from the cache, and the instruction invalidates a line in an L1 cache, it may be desirable to also invalidate the copy of that line in an inclusive L2 cache. However, if certain checks later detect the mispredicted branch or privilege violation, an exception may be generated, and the invalidations resulting from the exception-generating instructions may need to be reversed. Thus, invalidations in a cache may depend on exception checking.

Another example of checking may involve checking for other versions of the data in the computer system in order to comply with ordering requirements. For example, a modified copy of a requested data line may be stored in a buffer (e.g., a write buffer or a victim buffer from a higher-level cache). This modified copy may have been modified more recently than a copy stored in a lower-level cache, and thus if such a copy is detected, a fill request to the lower-level cache may be cancelled so that the requesting device may receive the most recently modified copy of the requested data.

Other checks that may be performed are alias checks. Alias checking involves looking for problems that may occur in virtually addressed caches. Virtual memory systems may map a physical page of memory to more than one virtual address. These different virtual addresses (i.e., aliases) may be cached in more than one place in a virtually addressed cache. For example, data from a single physical page may potentially be cached in multiple locations within a virtually addressed cache if it maps to two or more different virtual addresses that map to different cache lines and different virtual pages. As a result, requesting a certain line using one virtual address may generate a miss even though requesting the same line using a different alias may generate a hit. Alias checking may detect that an apparent miss actually hit on an aliased line in a virtually addressed cache. For example, in one embodiment, a virtually-addressed L1 cache may include independent instruction and data caches. The L1 cache may be configured so that a copy of the same data may reside in both the instruction and data caches at the same time. The L1 controller may not be configured to check for an aliased copy when selecting a L1 victim in the data cache. As a result, an L1 victim may be copied back to an exclusive L2 cache even though an aliased copy of that line may still exist in the instruction cache (or the data cache, if the victim was selected from the instruction cache). As a result, a later fill request for that data may miss in the L1 (before alias checks have completed) but hit in the L2. Since the alias checking should detect the aliased copy in the L1 cache, the line should not be invalidated in the L2 cache. Thus, in such an embodiment, an invalidation in an exclusive cache may depend on the results of the alias checking.

Yet another example of checking may determine whether a line may be accessed based on its state. Many systems track each line's MESI or MOESI (Modified, Owned, Exclusive, Shared, Invalid) state. Depending on the state a line is in, it may or may not be permissible to perform certain operations on that line. For example, if a fill request from a L1 instruction cache hits on a modified line in the L2 cache, it may not be proper to serve the fill request until after the modified L2 line has been written to memory (e.g., such a restriction may be used if the instruction cache does not store cache coherency states). Thus, some checking may involve determining whether a particular access is proper, given the current state of the line.

Thus, in either exclusive or inclusive caches, cache lines may be invalidated as part of or the result of another cache operation. At the same time, these invalidations may be reversed by the results of various checks that may take a relatively long time to complete. If the invalidations are delayed until after the checks complete, the caches may spend an undesirable amount of time waiting on the checks. If the cache controller is waiting for the checks to complete before invalidating the line, it may be unable to perform other operations, and thus this delay may negatively impact cache performance. Alternately, if the cache controller performs the invalidation before the checks complete, there may be no way to recover the invalidated line if the invalidation is later revealed to be erroneous. As a result, while performing the checks may improve the accuracy of the cache subsystem, this improved accuracy may come at the expense of performance.

Cache Controller

In order to improve the performance of a cache subsystem such as the one shown in FIG. 2, a cache controller may be configured to speculatively invalidate cache lines in response to an instruction or request, even if checks on the request have not completed. For example, in order to minimize a lower-level exclusive cache's access latency, a fill request (which, if it hits in the exclusive cache, will ultimately invalidate a line in the exclusive cache) may be sent to the lower-level exclusive cache controller as soon as a miss is detected in the higher-level cache. This may involve sending a request to the lower-level exclusive cache controller before various checks such as aliasing and ordering requirements have been performed. These checks may take several cycles to complete, but it may be rare for them to actually fail. Thus, speculatively invalidating a cache line before the checks complete may generally produce the correct result while at the same time avoiding any unnecessary delays. In addition to possibly providing better efficiency, one benefit that may result from configuring a cache controller to perform speculative invalidations is better resource usage. For example, an exclusive cache controller may be able to implement the tag lookup and the speculative invalidation as a single command, instead of having to implement each command separately.

On the rare occasion that the checks actually fail, the invalidation-causing instruction or request may be cancelled, delayed and/or retried after the problem that caused the checks to fail has been corrected. For example, if a fill request from an instruction cache hits in an exclusive L2 cache, the request may be cancelled if the hit line in the L2 cache is in a modified state. If the hit line was speculatively invalidated, however, it may be impossible to reverse the invalidation at the time the checks complete. In order to avoid this situation, a cache controller that is configured to perform speculative invalidations may also be configured to provide a recovery method that allows the speculatively invalidated line to be restored if the checks subsequently fail.

In one embodiment, a cache controller may provide such a recovery mechanism by protecting the speculatively invalidated line until after the checks complete. Thus, speculatively invalidating the line may allow the cache controller to move on to other operations that do not modify the speculatively invalidated line. For example, in some embodiments, a cache controller may be presented with several requests between the time a line is speculatively invalidated and the time the checks complete. In order to prevent conflicts between these successive instructions or requests and the speculative invalidation (in case the speculative invalidation is later reversed), the cache controller may be configured to not accept any requests that present potential conflicts. The cache controller may be configured to screen out requests that relate to the speculatively invalidated line even if those requests don't actually modify the line. For example, if the speculative invalidation is ultimately reversed (e.g., because one of the checks reveals an error), not accepting these non-modifying requests until after the checks complete may prevent a request from erroneously being processed as if the line was invalid. Thus, in one embodiment, the cache controller may be configured to not accept any requests or instructions having tags that match a portion of the tag of the speculatively invalidated line.

In a slightly more elaborate embodiment, the cache controller may be configured to not accept requests based on the type of request or instruction presented and/or the potential effect of the instruction. For example, the cache controller may be configured to screen out fill requests, probes, or state changes that match the tag of the speculatively invalidated line. Additionally, the cache controller may be configured to not accept copy backs or fills that would replace the speculatively invalidated line based on both a tag match and the replacement state of the line. For example, assuming LRU replacement is being used, if a copy back matches the tag of the speculatively invalidated line and that line is the least recently used line in a set, that line will normally be replaced by a copy back. In order to protect the speculatively invalidated line, the cache controller may be configured to not accept the copy back. Alternately, the cache controller may be configured to accept the copy back but to replace another line (ignoring the current replacement state) instead of the speculatively invalidated line. If the replacement state of the speculatively invalidated line indicates that the copy back or fill will not overwrite the speculatively invalidated line (e.g., a LRU replacement scheme is being used and the speculatively invalidated line is not the LRU line), the cache controller may be configured to accept the request.

Figure 3:
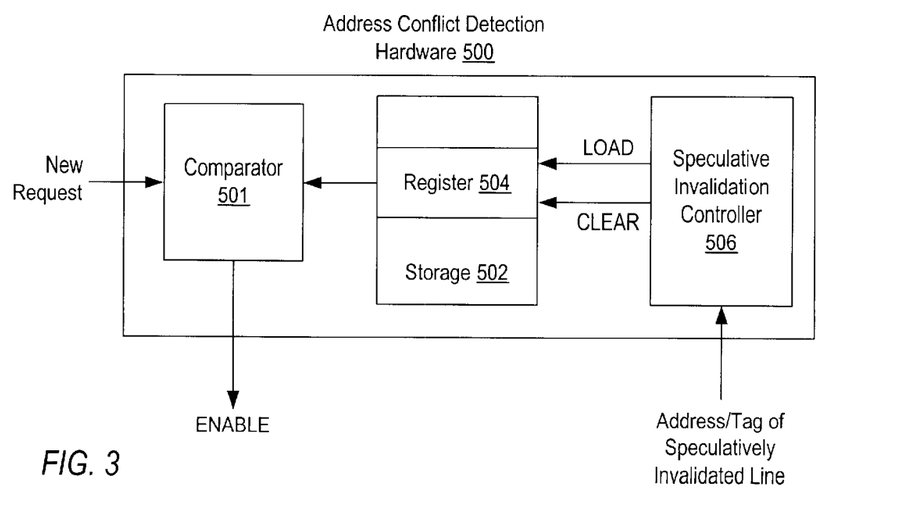
FIG. 3 illustrates one embodiment of address conflict detection hardware that may be used with a cache subsystem such as the one shown in FIG. 2.

In one embodiment, the cache controller may include address conflict detection hardware 500, as shown in FIG. 3. The address conflict detection hardware may be configured to detect any interactions between a request that resulted in a line being speculatively invalidated and any subsequent requests or instructions received between the time the line is invalidated and the time at which the checks for the speculative invalidation complete.

The address conflict detection hardware 500 may include an address register 504 configured to store all or part of the address corresponding to the speculatively invalidated line. For example, the address register 504 may store the tag of a speculatively invalidated line. To provide the ability to speculatively invalidate multiple lines, several of these registers 504 may be provided in a storage unit 502. A comparator 501 may compare the address in a pending request to the address(es) in the address register 504 and/or storage unit 502. If the addresses do not match, the comparator 501 may assert an enable signal. Based on the state of the enable signal, the cache controller may or may not accept the pending request. For example, if the pending request's address matches the address (or portion of the address) corresponding to the speculatively invalidated line, the comparator 501 may deassert the enable signal, causing the cache controller to not accept the pending request.

A speculative invalidation controller 506 may control the address conflict detection hardware 500 in some embodiments. The speculative invalidation controller 506 may be configured to load one of the registers 504 in the storage unit 502 with a portion of the address or tag of a speculatively invalidated line. The speculative invalidation controller 506 may be configured to protect the speculatively invalidated line(s) for the maximum number of cycles certain checks may take to complete. For example, the speculative invalidation controller 506 may be configured to protect the speculatively invalidated line(s) for the number of cycles it may take for alias checking to complete. In another embodiment, the speculative invalidation controller 506 may protect the speculatively invalidated line(s) for the number of cycles it may take for exception checking to complete.

In one embodiment, the speculative invalidation controller 506 may protect the speculatively invalidated line for a certain number of cycles by loading the portion of the tag or address of the speculatively invalidated line into a register 504 and causing the value in that register to be compared to incoming requests by the comparator 501. After the specified number of cycles, the speculative invalidation controller 506 may clear the register 504, or instruct the comparator 501 to no longer compare the value in register 504 to incoming requests. The speculative invalidation controller may also be configured to bypass the comparator 501 by asserting the enable signal if there are no speculatively invalidated lines to protect.

In one embodiment, until the checks complete, the address conflict detection hardware 500 may allow the cache controller to accept additional fill requests so long as they are not related to the speculatively invalidated line. Similarly, additional probe or state-change requests may be accepted as long as they do not involve the speculatively invalidated line, and a L1 to L2 copy back may be accepted as long as it does not select the speculatively invalidated line for replacement. Thus, additional comparisons may detect certain types of instructions, and only those instructions may be compared to the values in the address registers 504 in the storage unit 502.

In order to detect whether an L1 to L2 copy back selects the speculatively invalidated line, the address conflict detection hardware may include additional logic to detect which line will be selected for replacement. For example, in a N-way set associative cache that uses LRU replacement, a copy back will normally replace the least recently used line in a set. If the least recently used line in the appropriate set is the speculatively invalidated line, however, the copy back should not be accepted. Alternately, instead of not accepting the copy back, the copy back may accepted but, instead of replacing the speculatively invalidated line, the copy back may replace another line in the set, disregarding the LRU state of the speculatively-invalidated line. Thus, the address conflict detection hardware 500 may include logic that determines whether a speculatively invalidated line will be replaced by a copy back depending on replacement state (e.g., LRU state, FIFO, etc.) of the line or the set containing the line. If a copy back will replace the speculatively invalidated line, the address conflict detection hardware 500 may either deassert the enable signal or cause the copy back to replace another line.

Thus, returning to FIG. 2, instead of waiting several cycles for checks to complete, the cache controller 419 may be configured to speculatively invalidate a line in response to a first request or instruction if checks associated with the first request or instruction have not yet completed. The cache controller may speculatively invalidate the line by marking the line invalid (e.g., toggling a validity bit from valid to invalid). In a preferred embodiment, the cache controller may indicate that the line is invalid without affecting the data stored in the line so that the line may be more easily un-invalidated if any of the checks fail. The cache controller 419 may also include a protection mechanism such as address conflict detection hardware 500 to protect speculatively invalidated lines. Accordingly, the cache controller 419 may initiate a protection mechanism in conjunction with speculatively invalidating a line. For example, all or part of the address corresponding to the speculatively invalidated line may be loaded in an address register 504, initiating the protection mechanism illustrated in FIG. 3. If checks corresponding to the invalidation fail, the cache controller 419 may reverse the speculative invalidation by indicating that the line is once again valid (e.g., toggling a validity bit from invalid to valid). The cache controller 419 may also be configured to shut off the protection mechanism after the checks are complete.

As mentioned earlier, in many embodiments, the cache controller 419 may replace lines in a cache using some sort of replacement scheme. For example, the cache controller may use an LRU or FIFO replacement scheme. In order to implement such a scheme, the cache controller may save replacement state information for each line or group of lines. In an embodiment implementing an LRU replacement scheme, this replacement state may indicate the relative usage status of each line in the cache or a portion of a cache (e.g., a set in a set-associative cache). Alternately, in an embodiment implementing a FIFO replacement scheme, the replacement state may indicate how long each line has been in the cache or a portion of the cache (e.g., a set) relative to the other lines in that portion of the cache.

When a line is speculatively invalidated, the replacement state corresponding to the cache or portion of the cache may be updated as if the speculative invalidation was a non-speculative invalidation. However, if the speculative invalidation is later cancelled, the updated replacement state information may not reflect the appropriate replacement state for the line. To compensate, the cache controller 419 may be configured to save the preexisting replacement state when speculatively invalidating a line before updating the replacement state to reflect the invalidation. If the speculative invalidation is later reversed, the cache controller 419 may be configured to restore the saved replacement state. Thus, in some embodiments, the cache controller 419 may be configured to modify and save the replacement state when performing speculative invalidations.

Figure 4A:
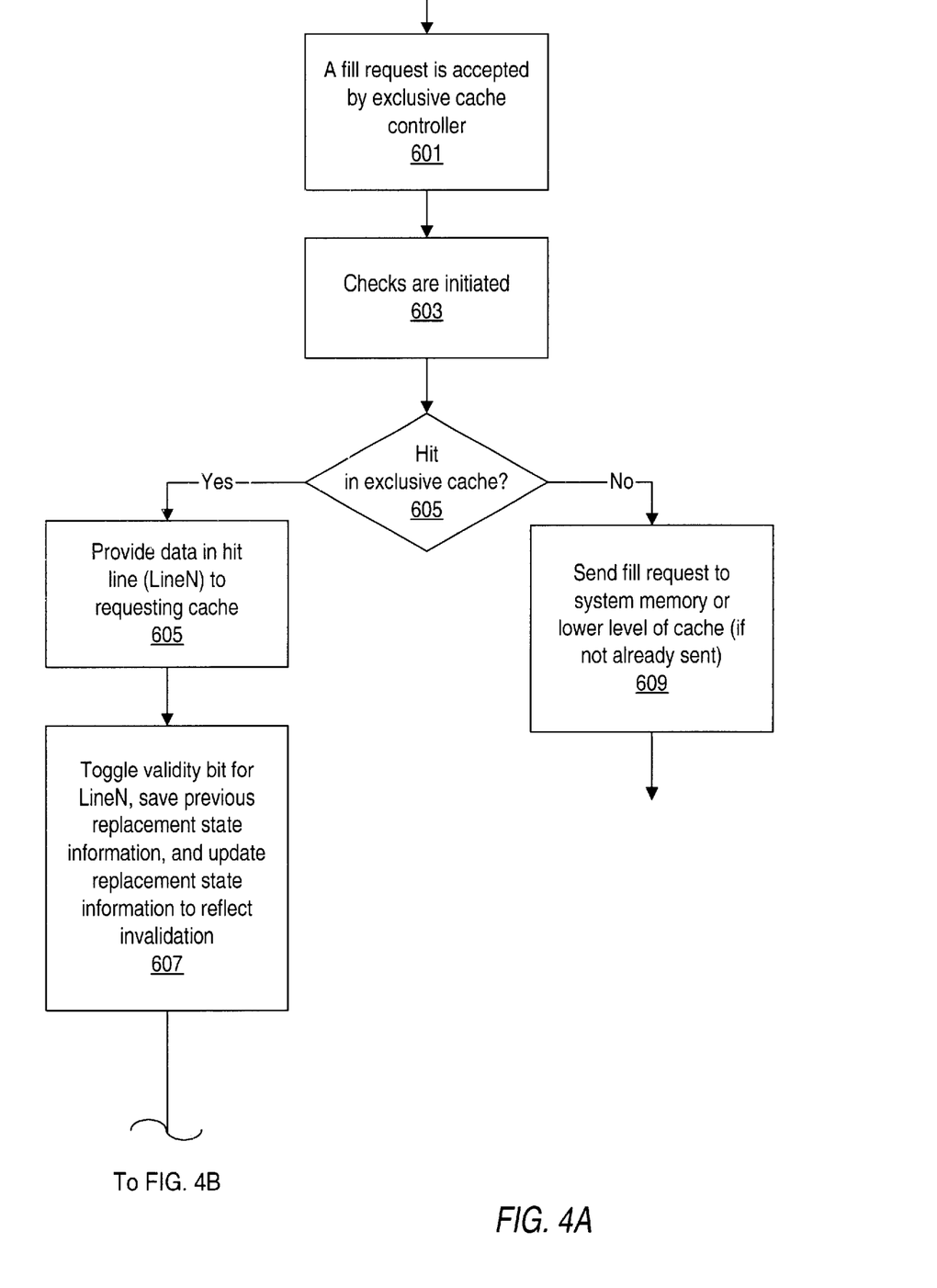
FIG. 4A is a flowchart illustrating how invalidations may be performed in an exclusive cache according to one embodiment.
Figure 4B:
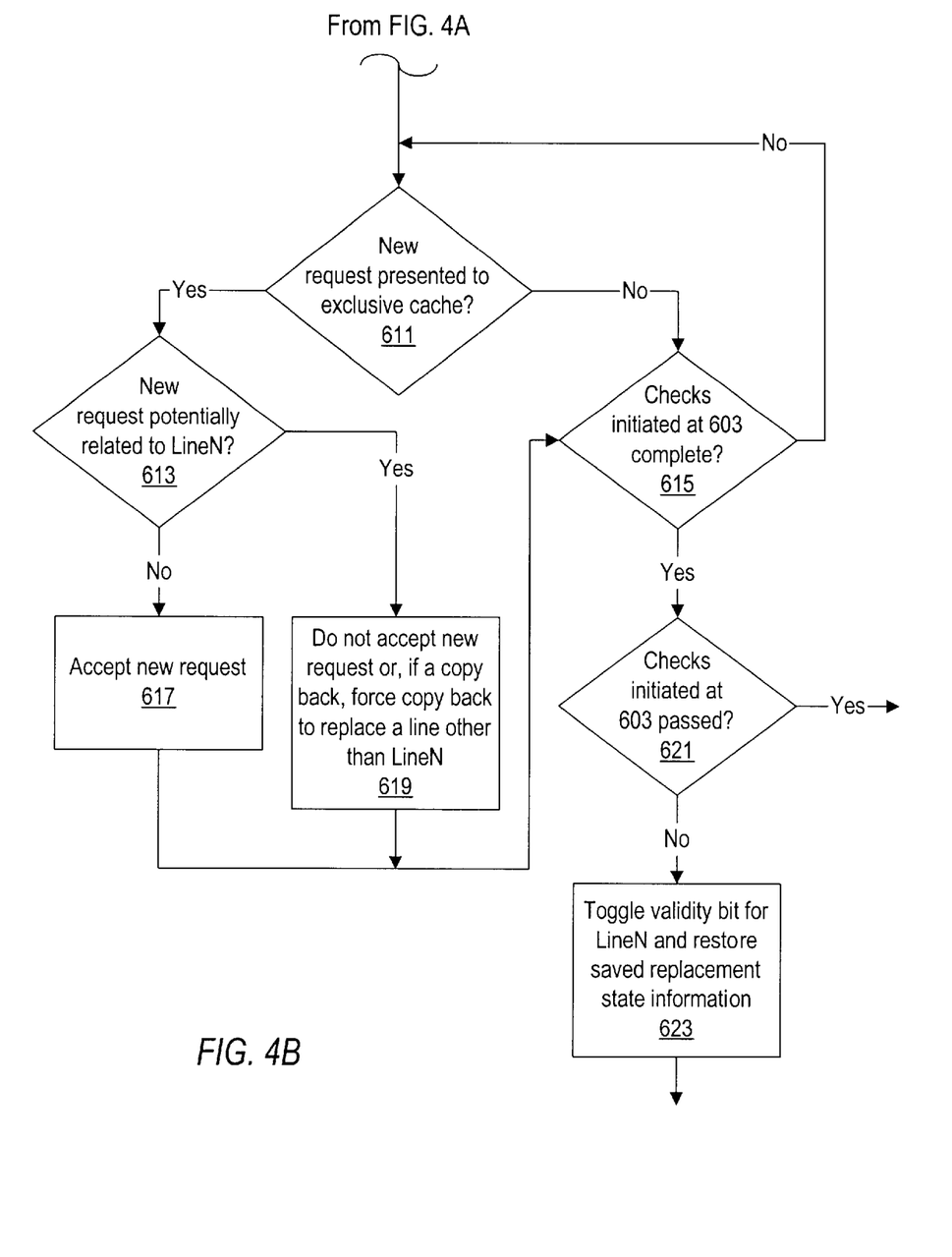
FIG. 4B continues the flowchart illustrated in FIG. 4A.

Turning now to FIGS. 4A and 4B, one embodiment of a method of performing speculative invalidations in an exclusive cache is shown. Note that while the functional blocks are arranged in a certain order in the illustrated embodiment, this arrangement is merely illustrative and does not imply that the method requires any particular temporal order, since other embodiments may use different arrangements of the functional blocks. At 601, a fill request is accepted by the exclusive cache controller. In some embodiments, the exclusive cache may be an L2 cache, and the exclusive cache controller may actually control both the L1 and L2 caches. At some point before or after the exclusive cache accepts the request, checks may be initiated on the miss in the requesting cache and/or on a hit in the exclusive cache that results from the request, as indicated at 603.

If the fill request accepted at 601 hits in the exclusive cache, the exclusive cache may provide the requested line of data to the requesting cache, as indicated at 605. For convenience, the requested line is hereinafter referred to as "LineN." To maintain exclusivity, the exclusive cache controller may invalidate LineN, as indicated at 607. However, this invalidation may occur before the checks initiated at step 603 complete, so the cache controller may perform the invalidation speculatively. In order to reverse the invalidation in case the checks fail, at 607 the cache controller may also save the previous replacement state information (i.e., information that determines which line in a set or cache will be replaced first, such as LRU information or FIFO information) corresponding to LineN if the invalidation affects that replacement state information and update the replacement state information to reflect the invalidation.

An additional component of the speculative invalidation may involve the exclusive cache controller initiating a protection mechanism that protects LineN. Thus, while LineN has been invalidated, freeing up the exclusive cache controller to accept other requests, the exclusive cache controller may postpone or refuse to accept requests that potentially affect or depend on LineN until after the checks complete. Accordingly, at 611, if a new request is presented to the exclusive cache, and that request potentially affects or depends on LineN, as shown at 613, the cache controller may not accept the request. For example, the cache controller may not accept a request that would overwrite LineN. However, if the request does not relate to LineN, the exclusive cache may accept the request and process it accordingly, as indicated at 617. In some embodiments, the exclusive cache controller may determine whether a request potentially affects LineN by checking whether the tag of the request matches LineN's tag. In one embodiment, when a copy back request is presented, the exclusive cache controller may also include logic that determines whether LineN would be replaced by the copy back, given the current replacement state. If LineN would be replaced, the exclusive cache controller may either not accept the copy back or accept the copy back but force it to replace another line instead of LineN.

If the checks initiated at 603 have failed, the exclusive cache controller may use the recovery mechanism to reverse the invalidation, at 623. For example, the exclusive cache controller may mark the line valid again (e.g., by toggling a validity bit from invalid to valid) and restore the pre-invalidation replacement state information corresponding to LineN. If instead the checks initiated at 603 passed, the exclusive cache controller may stop screening requests that may potentially affect the speculatively invalidated LineN. Once the checks have passed, the invalidation may be treated as a non-speculative invalidation, and thus if replacement state information is saved at 607, the saved information may no longer be maintained once the checks complete.

In some embodiments, some of the checks initiated at 603 may complete before the cache controller completes the request accepted at 601, and if any of these checks fail, the request may be cancelled before a line is speculatively invalidated. In this situation, the cache controller may not speculatively invalidate the line (as opposed to performing the speculative invalidation shown at 607).

If the fill request accepted at 601 misses in the exclusive cache, the requesting cache may send a fill request to a lower level of cache or system memory, if it has not already done so, as indicated at 609. In many embodiments, the requesting cache may send a fill request to system memory contemporaneously with sending a fill request to the exclusive cache to minimize the system memory latency in the case where the fill request misses in the exclusive cache. After sending the fill request, the exclusive cache may continue receiving and responding to other requests.

Figure 5:
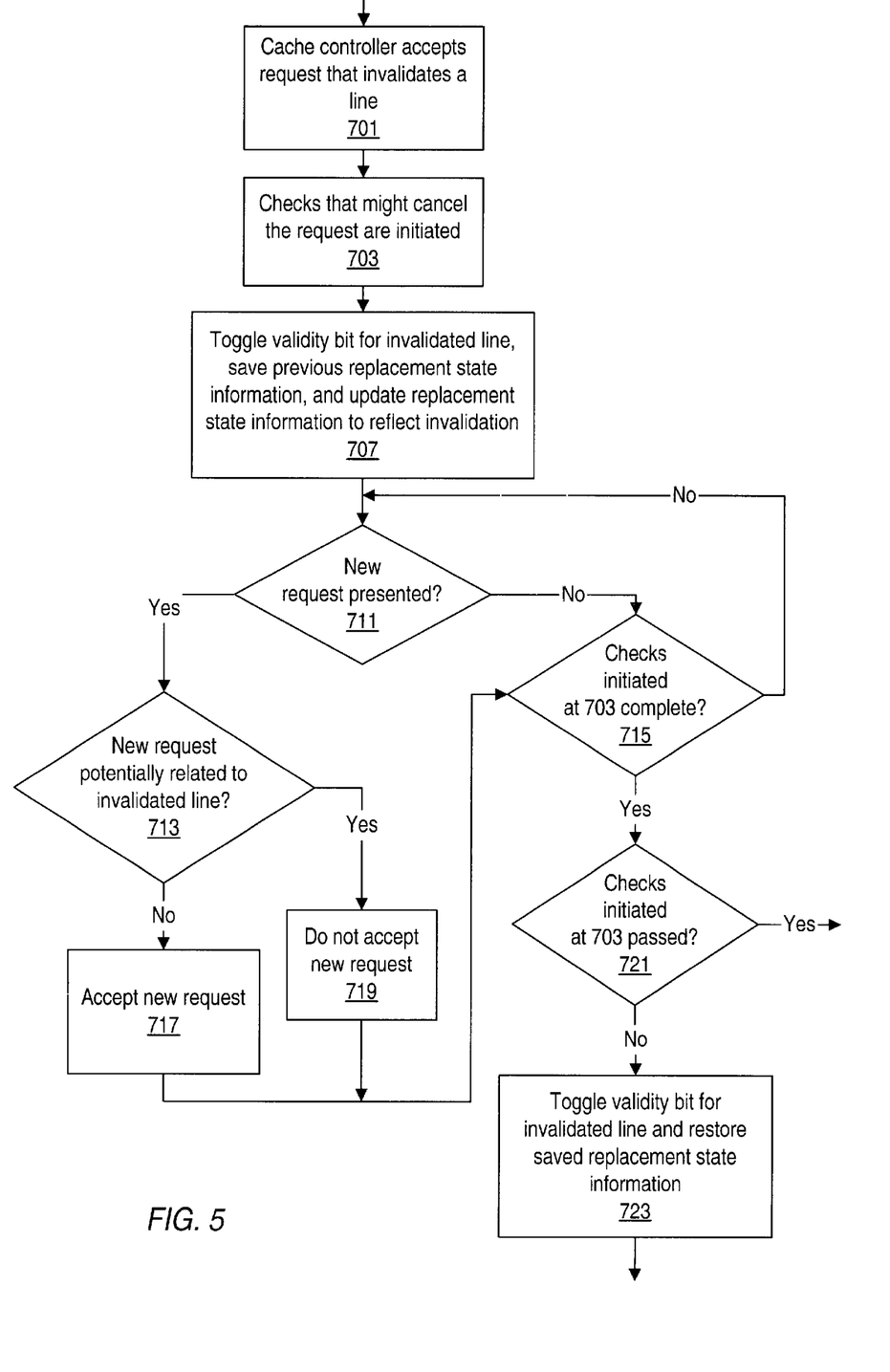
FIG. 5 shows one embodiment of a method of speculatively invalidating lines in a cache, regardless of whether the cache is inclusive, exclusive, or neither.

Turning now to FIG. 5, an embodiment of a method of performing a speculative invalidation in a cache, regardless of whether the cache is exclusive, inclusive, or neither exclusive nor inclusive, is provided. At 701, a cache controller may accept an instruction or request. For example, an accepted instruction may be a fill request, a copy back, a probe, a state change, or an invalidation. Satisfying this request may ultimately require a line in the accepting cache to be invalidated. However, certain checks may be performed (as shown at 703) on the source of the instruction or request (e.g., a miss in a higher level cache) or the event that led to the invalidation (e.g., a hit in an exclusive cache) and, if these checks fail, the request and/or the invalidation may be cancelled. Since these checks may take several cycles to complete, the cache controller may speculatively invalidate the line so that the cache controller may continue to accept new requests while the checks are being completed. Thus, at 707, the cache controller may speculatively invalidate the line by toggling the validity bit for the line and, if the invalidation affects the replacement state information corresponding to the invalidated line, saving the previous replacement state information and updating the replacement state information to reflect the invalidation.

The cache controller may protect the speculatively invalidated line by not accepting requests that may affect or depend on the speculatively invalidated line until the checks initiated at 703 complete. Thus, if a new request is presented that potentially relates to the invalidated line and the checks have not completed, the cache controller may not accept the request, as shown at 719. At 717, the cache controller may accept a request that does not potentially relate to the speculatively invalidated line. If the checks pass, the cache controller may cease to protect the speculatively invalidated line, since the invalidation is no longer speculative. If the checks fail however, the cache controller may reverse the invalidation, as shown at 723, by toggling the validity bit for the invalidated line to indicate that it is valid and, if replacement state information was saved, restoring the saved replacement state information.

If some embodiments, if any of the checks fail before the cache controller completes the request accepted at 701, the request may be cancelled before a line is speculatively invalidated. In this situation, the cache controller may not speculatively invalidate the line (as opposed to performing the speculative invalidation shown at 707).

Computer System

Figure 6:
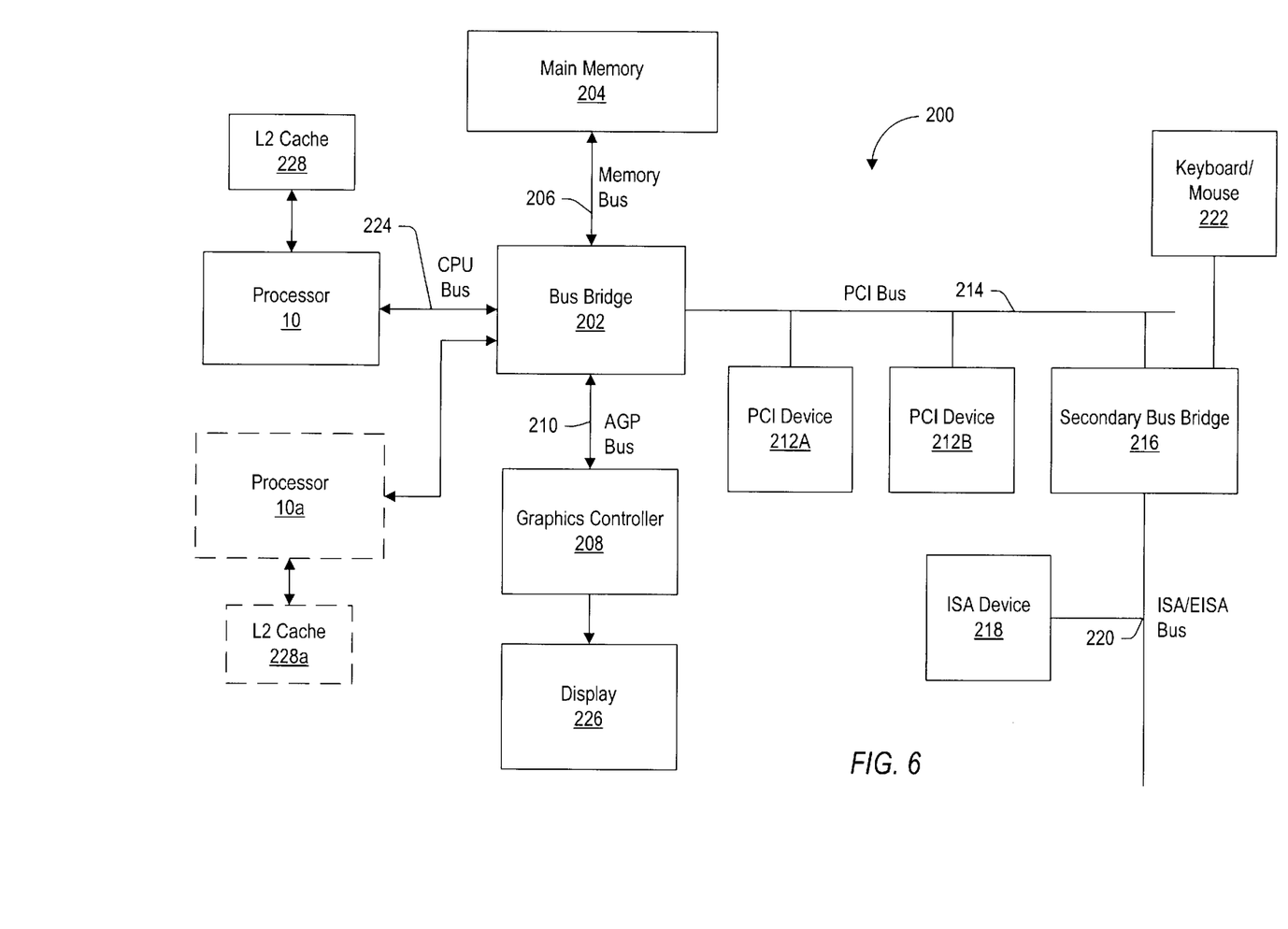
FIG. 6 is a block diagram of one embodiment of a computer system.

FIG. 6 shows a block diagram of one embodiment of a computer system 200 that includes a processor 10 coupled to a variety of system components through a bus bridge 202. Other embodiments of a computer system are possible and contemplated. In the depicted system, a main memory 204 is coupled to bus bridge 202 through a memory bus 206, and a graphics controller 208 is coupled to bus bridge 202 through an AGP bus 210. Several PCI devices 212A–212B are coupled to bus bridge 202 through a PCI bus 214. A secondary bus bridge 216 may also be provided to accommodate an electrical interface to one or more EISA or ISA devices 218 through an EISA/ISA bus 220. In this example, processor 10 is coupled to bus bridge 202 through a CPU bus 224 and to an optional L2 cache 228. In some embodiments, the processor 10 may include an integrated L1 cache (not shown).

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g., a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may incorporate additional functionality. An input/output controller (not shown), either external from or integrated with secondary bus bridge 216, may also be included within computer system 200 to provide operational support for a keyboard and mouse 222 and for various serial and parallel ports. An external cache unit (not shown) may also be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is shown in a backside configuration to processor 10. It is noted that L2 cache 228 may be separate from processor 10, integrated into a cartridge (e.g., slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures that can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g., processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 6) or may share CPU bus 224 with processor 10. Furthermore, processor 10a may be coupled to an optional L2 cache 228a similar to L2 cache 228.

Multi-node Processing System

Figure 7:
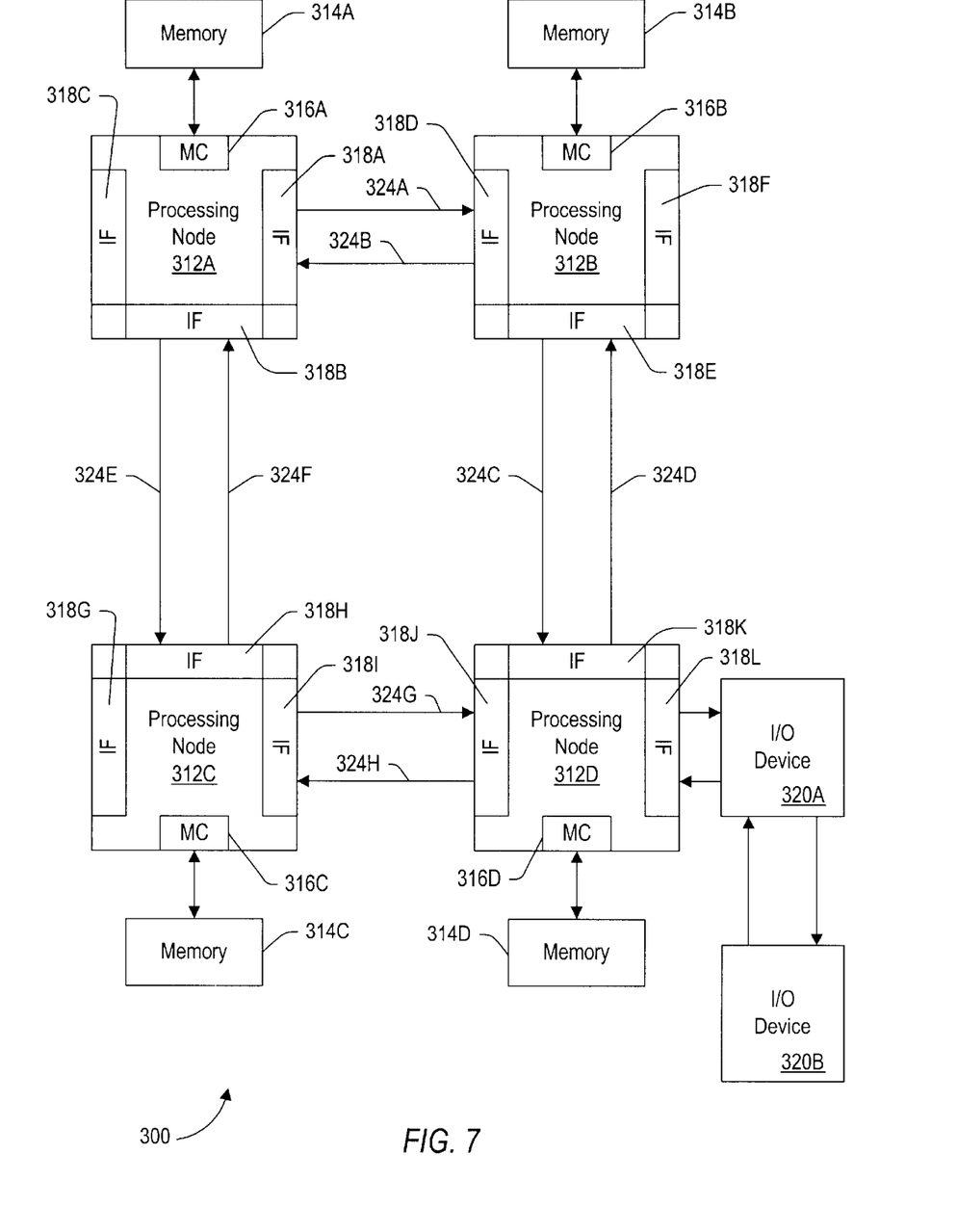
FIG. 7 shows one embodiment of a multi-node processing system.

Turning now to FIG. 7, another embodiment of a computer system 300 is shown. Other embodiments are possible and contemplated. In the embodiment of FIG. 7, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g., devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g., lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 7. Generally, each set of lines 324 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 7. Any suitable routing algorithm may be used. Other embodiments of computer system 300 may include more or fewer processing nodes then the embodiment shown in FIG. 7.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10. External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system. I/O devices 320A–320B may be any suitable I/O devices. For example, I/O devices 320A–320B may include devices for communicate with another computer system to which the devices may be coupled (e.g., network interface cards or modems). Furthermore, I/O devices 320A–320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. A computer system comprising:

a processor;

a system memory;

a cache coupled to the processor and comprising a plurality of cache line storage locations; and a cache controller coupled to receive a first request, wherein the cache controller is configured to speculatively invalidate a first cache line in a first cache line storage location in response to the first request, and wherein in response to speculatively invalidating the first cache line, the cache controller is further configured to prevent replacement of the first cache line until the invalidation of the first cache line becomes non-speculative; and an error detection unit configured to perform at least one check corresponding to the first request, wherein if the check is performed and does not detect any errors, the invalidation of the first cache line becomes non-speculative.

2. The computer system of claim 1, wherein the cache controller is configured to speculatively invalidate the first cache line by toggling a validity bit associated with the first cache line.

3. The computer system of claim 2, wherein if the check is performed and does detect an error, the cache controller is further configured to reverse the speculative execution by toggling the validity bit associated with the first cache line.

4. The computer system of claim 1, wherein the cache controller is further configured to not accept requests that depend on a state of or depend on data in the first cache line until the invalidation of the first cache line becomes non-speculative.

5. The computer system of claim 1, wherein the cache controller is configured to not accept additional requests based on a type of each additional request and whether each additional request depends on or modifies the speculatively invalidated first cache line until the invalidation of the first cache line becomes non-speculative.

6. The computer system of claim 1, wherein, until the invalidation of the first cache line becomes non-speculative, the cache controller is configured to not accept additional requests that are:

fill requests from a higher-level cache that hit the first cache line;

probe or state-change requests for the first cache line; or copy backs from the higher-level cache that select the first cache line for replacement.

7. The computer system of claim 1, wherein the cache controller is configured to not accept additional requests that match a first portion of a first tag of the first cache line until the invalidation of the first cache line becomes non-speculative.

8. The computer system of claim 1, wherein as part of the speculative invalidation, the cache controller is further configured to save a pre-speculative invalidation replacement state associated with the first cache line and to update a post-speculative invalidation replacement state as if the first cache line had been invalidated.

9. The computer system of claim 8, wherein if the check is performed and does detect an error, the cache controller is further configured to restore the saved pre-speculative invalidation replacement state.

10. The computer system of claim 1, wherein the cache controller is further configured to accept additional requests that modify the first cache line after the invalidation of the first cache line becomes non-speculative.

11. The computer system of claim 1, wherein the at least one check comprises an ordering check.

12. The computer system of claim 1, wherein the at least one check comprises an alias check.

13. The computer system of claim 1, wherein the at least one check comprises a check for whether an access to an accessed cache line is proper given a state of the accessed cache line.

14. The computer system of claim 1, wherein the cache comprises an exclusive cache, and wherein the first request is a fill request from a higher level cache with respect to which the cache is exclusive.

15. A method of speculatively invalidating a line in a cache, the method comprising:
accepting a request that results in the line in the cache being invalidated;
initiating checks that determine whether or not the invalidation is erroneous;
in response to said accepting, speculatively invalidating the line, wherein said
speculatively invalidating comprises indicating that the line is invalid and protecting the line from subsequent modification until the checks have completed, and wherein in response to said accepting, said protecting further comprises not accepting additional requests that depend on data in or a state of the speculatively invalidated line until the checks have completed;
in response to one of the checks determining that the invalidation is erroneous, reversing the speculative invalidation by indicating that the line is valid.

16. The method of claim 15, wherein said speculatively invalidating comprises toggling a validity bit associated with the line.

17. The method of claim 16, wherein said reversing comprises toggling the validity bit associated with the line.

18. The method of claim 15, wherein said protecting comprises not accepting additional requests that match a first portion of a tag of the speculatively invalidated line.

19. The method of claim 15, wherein said speculatively invalidating further comprises saving pre-speculative invalidation replacement state information associated with the line and updating post-speculative invalidation replacement state information as if the first cache line had been invalidated.

20. The method of claim 19, further comprising restoring the saved pre-speculative invalidation replacement state information in response to one of the checks determining that the invalidation is erroneous.

21. The method of claim 15, further comprising ceasing said protecting after the checks complete.

22. A method of speculatively invalidating a first cache line in an exclusive cache, the method comprising:
accepting a fill request from a higher-level cache;
determining whether the fill request hits in the exclusive cache;
initiating checks that determine whether the fill request initiated erroneously;
in response to the fill request hitting in the exclusive cache, providing the first cache line from the exclusive cache to the higher-level cache and, if the checks have not yet completed, speculatively invalidating the first cache line in the exclusive cache, wherein said speculatively invalidating comprises indicating that the first cache line is invalid and protecting the first cache line from subsequent modification until the checks complete; and
in response to one of the checks related to the fill request determining that the fill request initiated erroneously, reversing the speculative invalidation of the first cache line.

23. The method of claim 22, wherein said indicating that the first cache line is invalid comprises toggling a validity bit associated with the first cache line.

24. The method of claim 23, wherein said reversing comprises toggling the validity bit associated with the first cache line.

25. The method of claim 22, wherein said speculatively invalidating further comprises not accepting additional requests that depend on a state of or data in the first cache line until the checks complete.

26. The method of claim 22, wherein said protecting comprises preventing additional requests that match a first portion of a first tag of the speculatively invalidated line from being accepted.

27. The method of claim 22, wherein said protecting comprises detecting that a copy back will overwrite the speculatively invalidated line and, in response to said detecting, forcing the copy back to overwrite a different line.

28. The method of claim 22, wherein said speculatively invalidating further comprises saving pre-speculative invalidation replacement state information associated with the line and updating post-speculative invalidation replacement state information as if the first cache line had been invalidated.

29. The method of claim 28, further comprising restoring the saved pre-speculative invalidation replacement state information in response to one of the checks determining that the fill request initiated erroneously.

30. A cache subsystem comprising:
a cache comprising a plurality of cache line storage locations; and
a cache controller coupled to receive a first request and configured to speculatively invalidate a first cache line in a first cache line storage location in response to receiving the first request, wherein the cache controller is further configured to reverse the speculative invalidation of the first cache line if the speculative invalidation is detected to be erroneous, wherein detecting whether the speculative invalidation is erroneous takes a number of cycles; and
a speculative invalidation controller configured to protect the first cache line from modification for the number of cycles in response to the cache controller speculatively invalidating the first cache line, wherein the speculative invalidation becomes non-speculative after the number of cycles; wherein the speculative invalidation controller is further configured to prevent the cache controller from accepting additional requests that modify or depend on the speculatively invalidated first cache line for the number of cycles.

31. The cache subsystem of claim 30, wherein the cache controller is configured to speculatively invalidate the first cache line by toggling a validity bit associated with the first cache line.

32. The cache subsystem of claim 31, wherein cache controller is further configured to reverse the speculative execution by toggling the validity bit associated with the first cache line.

33. The cache subsystem of claim 30, wherein the speculative invalidation controller is configured to load a first portion of a tag of the first cache line into a register in response to the cache controller speculatively invalidating the first cache line.

34. The cache subsystem of claim 33, further comprising a comparator configured to compare the first portion of the tag stored in the register with another tag in an additional request sent to the cache controller, wherein the comparator is configured to deassert an enable signal if the tags match, wherein the comparator is further configured to provide the enable signal to the cache controller, and wherein the cache controller is configured to not accept a request received when the enable signal is deasserted.

35. The cache subsystem of claim 30, wherein the speculative invalidation controller is further configured to not protect the first cache line from subsequent modification after the speculative invalidation becomes non-speculative.

36. The cache subsystem of claim 30, wherein as part of the speculative invalidation, the cache controller is further configured to save a pre-speculative invalidation replacement state associated with the first cache line and to update a post-speculative invalidation replacement state as if the first cache line had been invalidated.

37. The cache subsystem of claim 36, wherein in response to receiving an indication that the speculative invalidation of the first cache line was erroneous, the cache controller is further configured to restore the saved pre-speculative invalidation replacement state.

38. The cache subsystem of claim 30, wherein the number of cycles comprises a number of cycles to complete alias checking on an event that initiated the first request.

39. The cache subsystem of claim 30, wherein the cache controller is further configured to protect the first cache line by detecting that a subsequent request overwrites the first cache line and, in response, forcing the subsequent request to overwrite a different cache line.

40. A computer system comprising:

a processor;

a system memory;

a cache coupled to the processor and comprising a plurality of cache line storage locations; and a cache controller coupled to receive a first request, wherein the cache controller is configured to speculatively invalidate a first cache line in a first cache line storage location in response to the first request, and wherein in response to speculatively invalidating the first cache line, the cache controller is further configured to prevent modification of the first cache line storage location until the invalidation of the first cache line becomes non-speculative; and an error detection unit configured to perform at least one check corresponding to the first request, wherein if the check is performed and does not detect any errors, the invalidation of the first cache line becomes non-speculative;

wherein the cache controller is further configured to not accept requests that depend on a state of or depend on data in the first cache line until the invalidation of the first cache line becomes non-speculative.

41. A computer system comprising:

a processor;

a system memory;

a cache coupled to the processor and comprising a plurality of cache line storage locations; and a cache controller coupled to receive a first request, wherein the cache controller is configured to speculatively invalidate a first cache line in a first cache line storage location in response to the first request, and wherein in response to speculatively invalidating the first cache line, the cache controller is further configured to prevent modification of the first cache line storage location until the invalidation of the first cache line becomes non-speculative; and an error detection unit configured to perform at least one check corresponding to the first request, wherein if the check is performed and does not detect any errors, the invalidation of the first cache line becomes non-speculative;

wherein the cache controller is configured to not accept additional requests based on a type of each additional request and whether each additional request depends on or modifies the speculatively invalidated first cache line until the invalidation of the first cache line becomes non-speculative.

42. A method of speculatively invalidating a line in a cache, the method comprising:

accepting a request that results in the line in the cache being invalidated;

initiating checks that determine whether or not the invalidation is erroneous;

in response to said accepting, speculatively invalidating the line, wherein said speculatively invalidating comprises indicating that the line is invalid and protecting the line from subsequent modification until the checks have completed, wherein said protecting comprises not accepting additional requests that match a first portion of a tag of the speculatively invalidated line; and in response to one of the checks determining that the invalidation is erroneous, reversing the speculative invalidation by indicating that the line is valid.

43. A cache subsystem comprising:

a cache comprising a plurality of cache line storage locations; and a cache controller coupled to receive a first request and configured to speculatively invalidate a first cache line in a first cache line storage location in response to receiving the first request, wherein the cache controller is further configured to reverse the speculative invalidation of the first cache line if the speculative invalidation is detected to be erroneous, wherein detecting whether the speculative invalidation is erroneous takes a number of cycles, wherein the number of cycles comprises a number of cycles to complete alias checking on an event that initiated the first request;

a speculative invalidation controller configured to protect the first cache line from modification for the number of cycles in response to the cache controller speculatively invalidating the first cache line, wherein the speculative invalidation becomes non-speculative after the number of cycles.

44. A cache subsystem comprising:

a cache comprising a plurality of cache line storage locations; and a cache controller coupled to receive a first request and configured to speculatively invalidate a first cache line in a first cache line storage location in response to receiving the first request, wherein the cache controller is further configured to reverse the speculative invalidation of the first cache line if the speculative invalidation is detected to be erroneous, wherein detecting whether the speculative invalidation is erroneous takes a number of cycles, wherein the cache controller is further configured to protect the first cache line by detecting that a subsequent request overwrites the first cache line and, in response, forcing the subsequent request to overwrite a different cache line; and a speculative invalidation controller configured to protect the first cache line from modification for the number of cycles in response to the cache controller speculatively invalidating the first cache line, wherein the speculative invalidation becomes non-speculative after the number of cycles.

* * * * *